Figure 1:
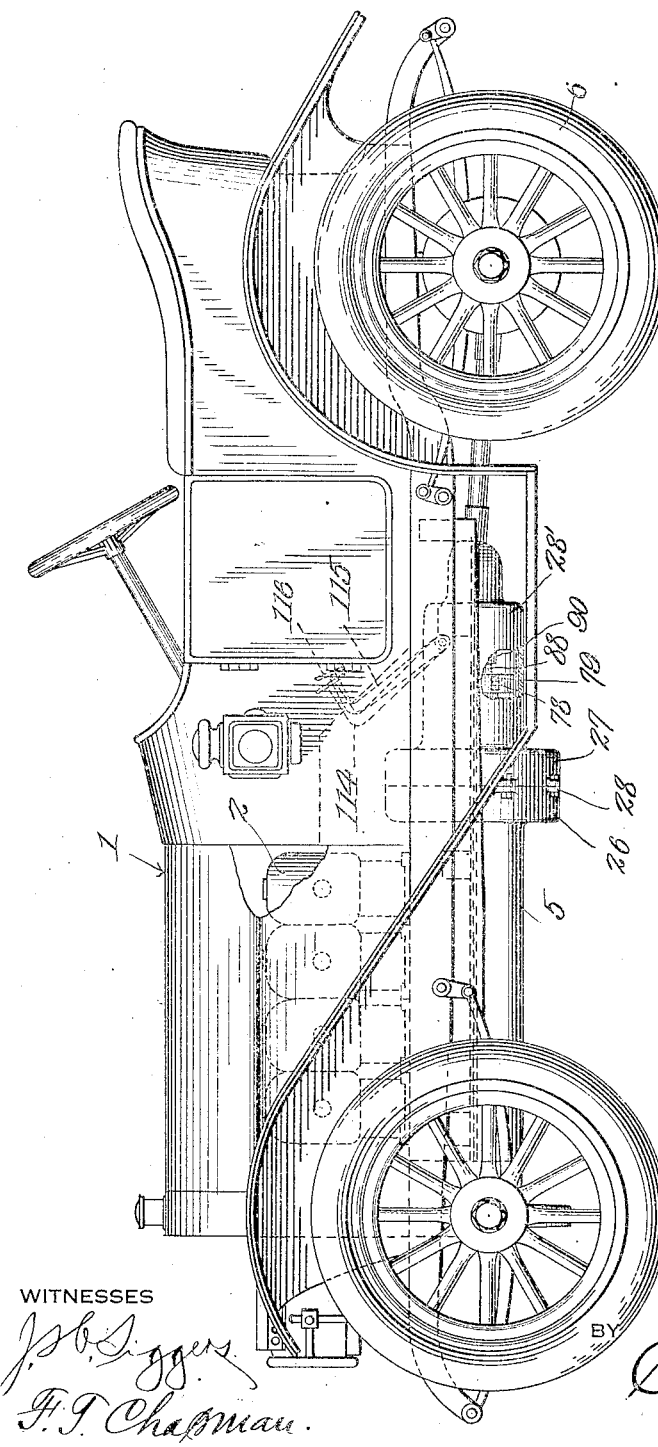

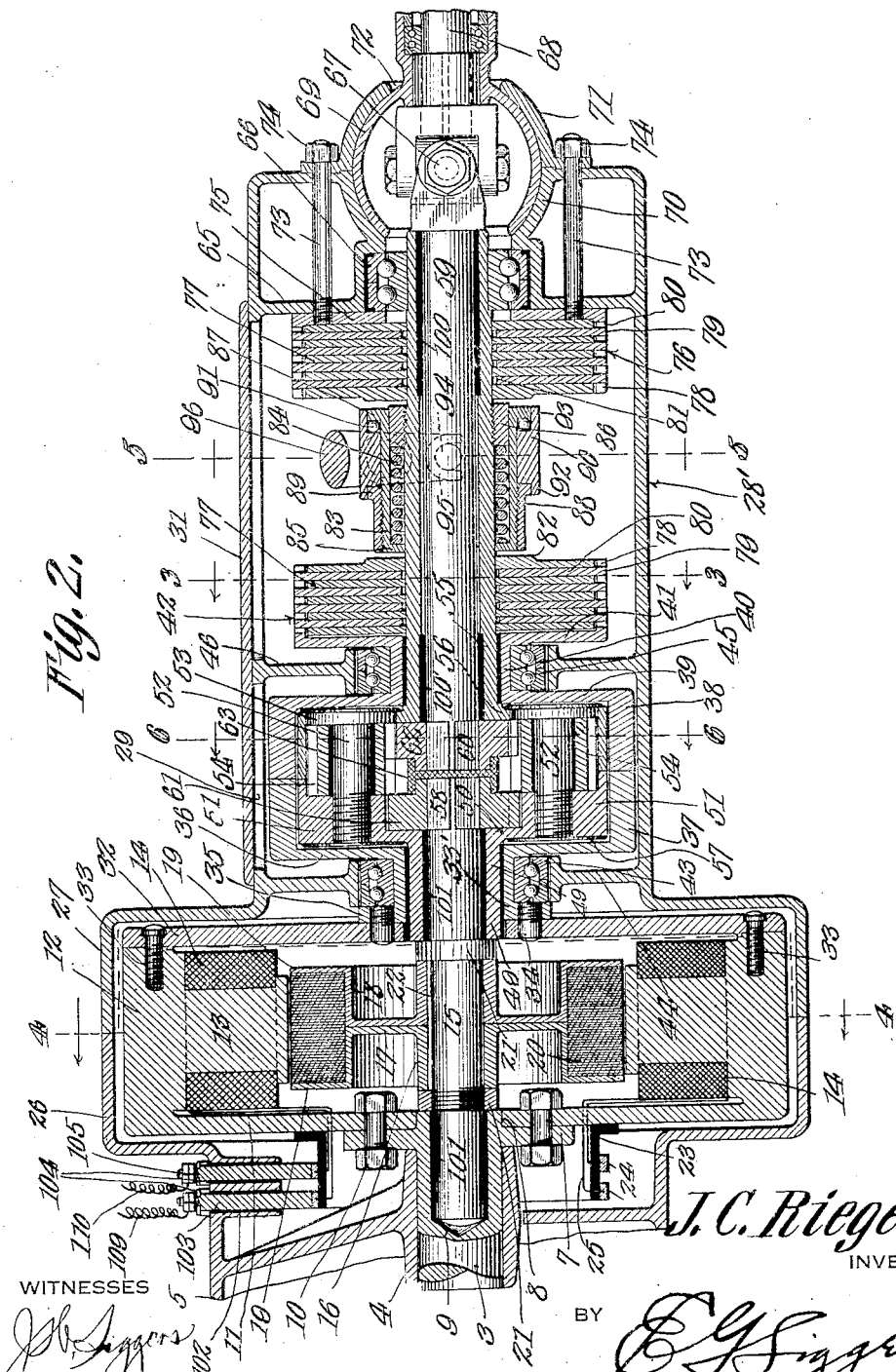

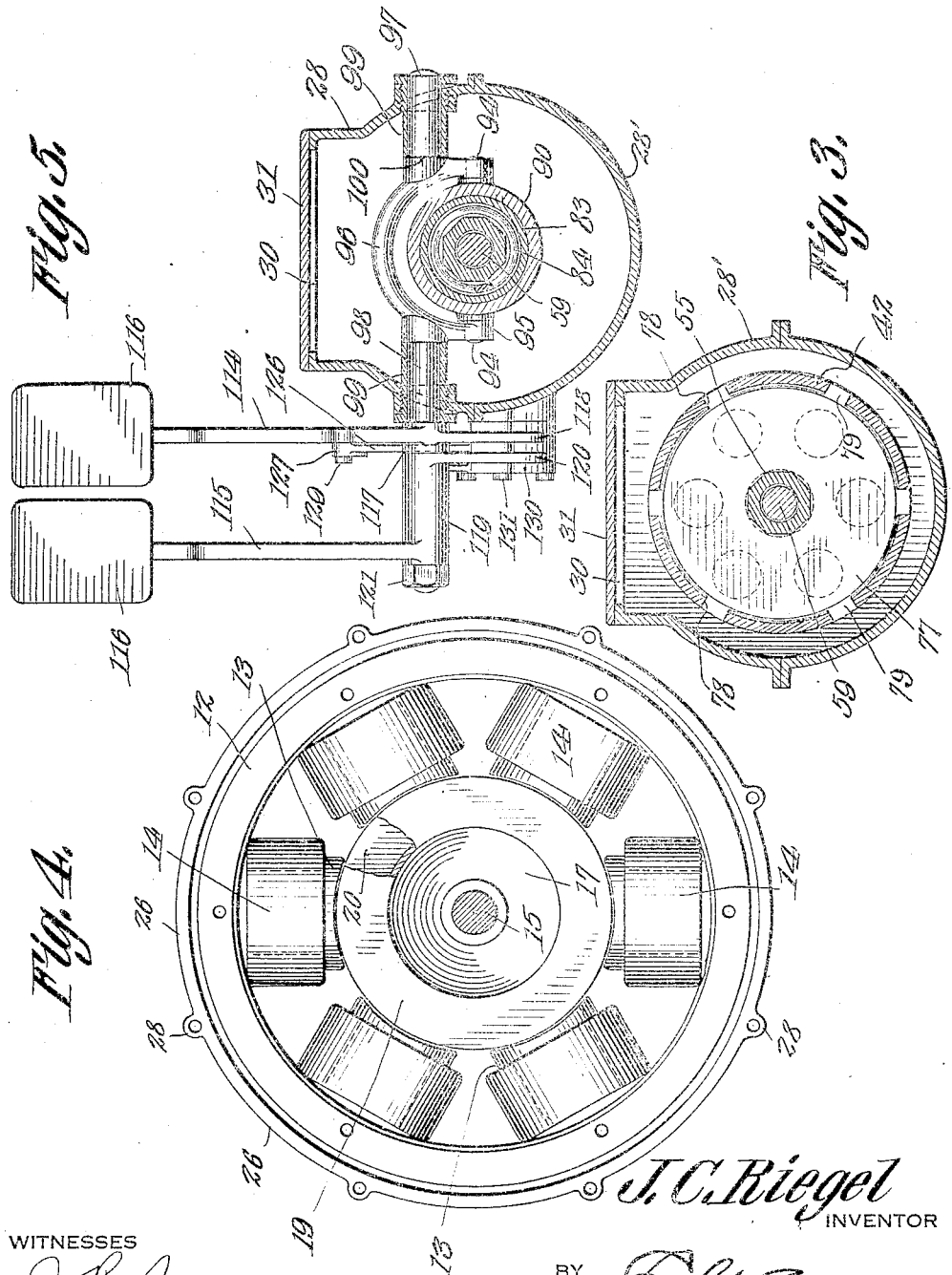

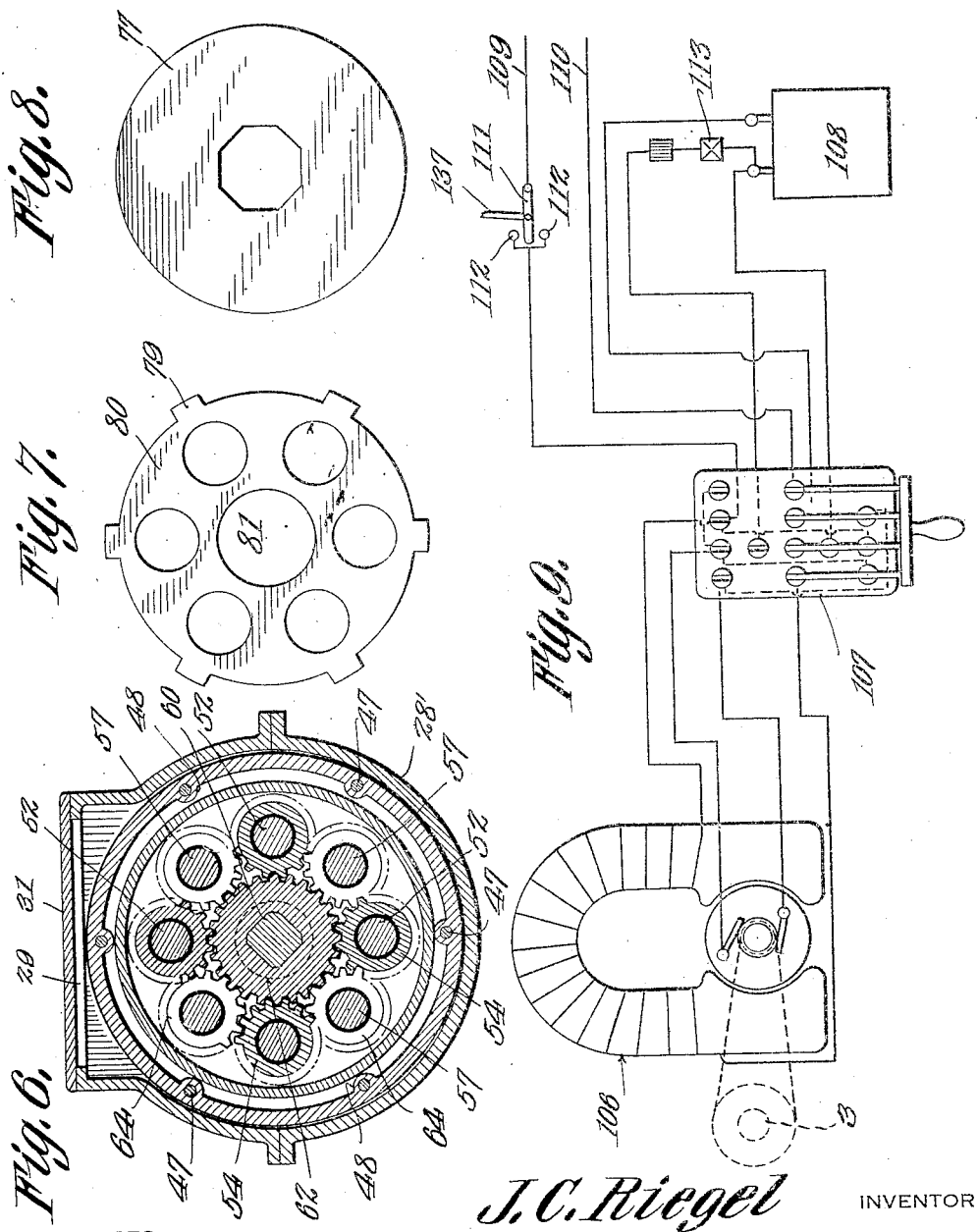

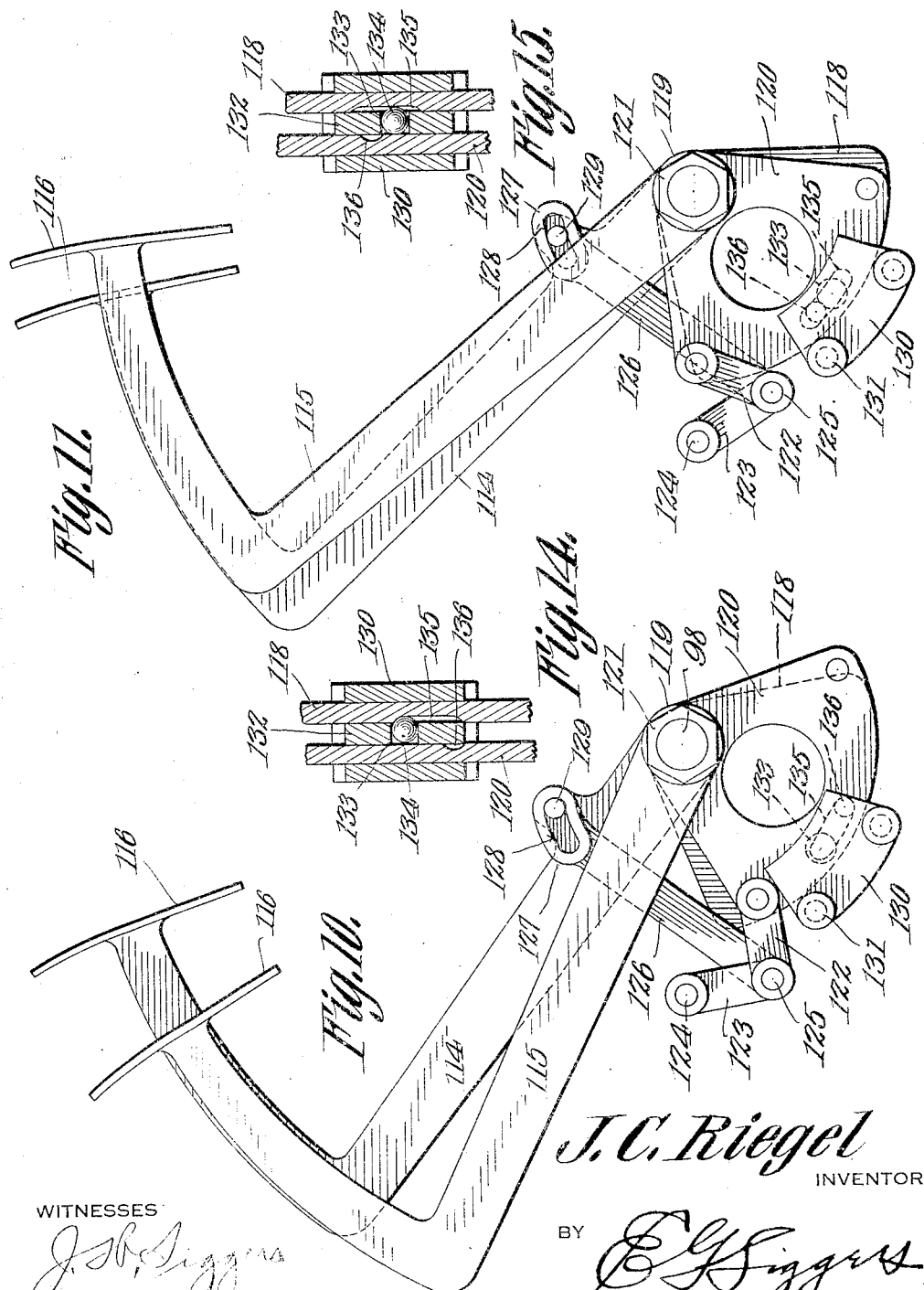

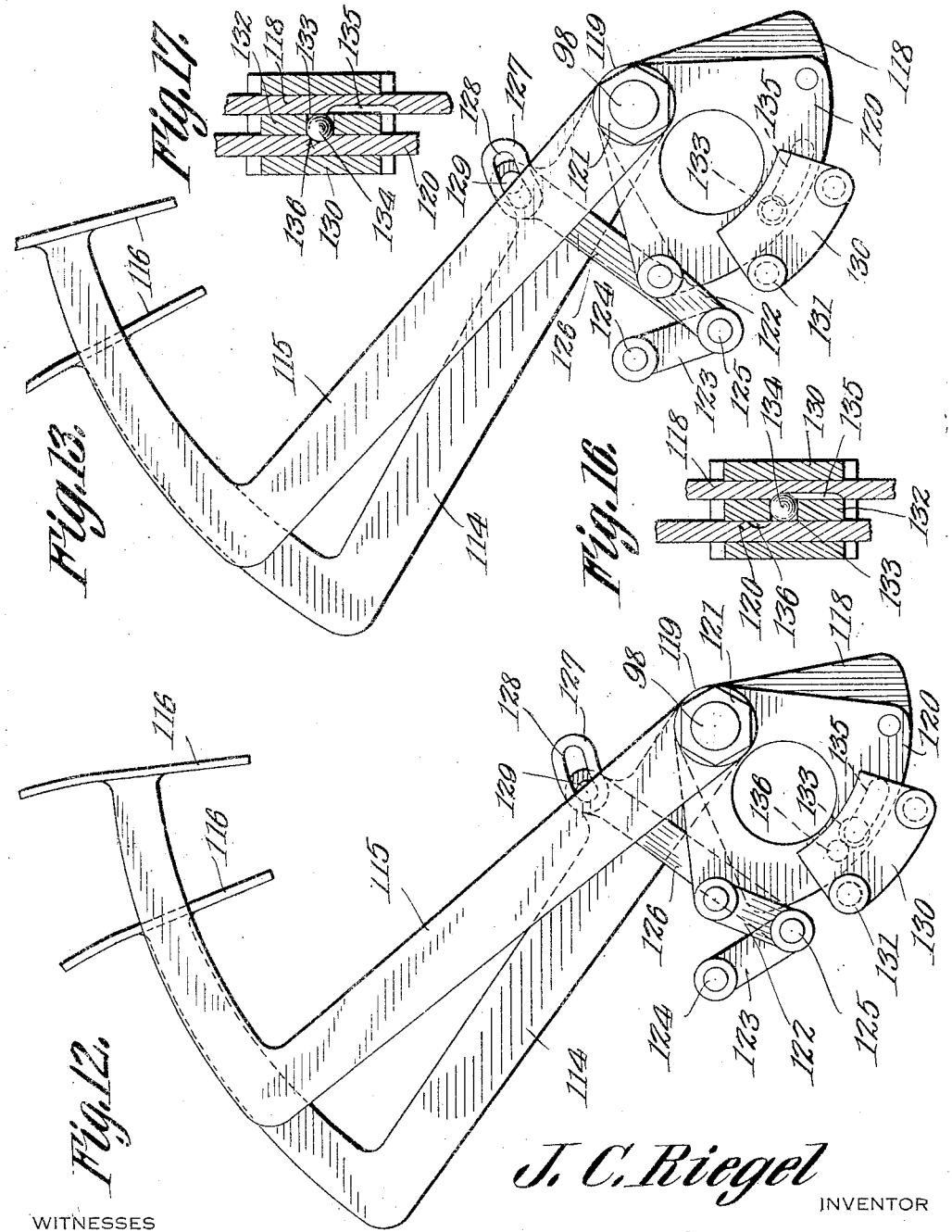

UNITED STATES PATENT OFFICE.

JOHN CLINTON RIEGEL, OF POTTSVILLE, PENNSYLVANIA.

VARIABLE-SPEED MECHANISM FOR MOTOR-VEHICLES.

1,080,782.   Specification of Letters Patent.   Patented Dec. 9, 1913.

Application filed November 30, 1912. Serial No. 734,375.

*To all whom it may concern:*

Be it known that I, JOHN C. RIEGEL, a citizen of the United States, residing at Pottsville, in the county of Schuylkill and State of Pennsylvania, have invented a new and useful Variable-Speed Mechanism for Motor-Vehicles, of which the following is a specification.

This invention has reference to improvements in variable speed mechanism for motor vehicles, or wherever it is desired to impart variable speed to a driven member from a driving member.

The object of the present invention is to provide a mechanism of this character which is simple in construction, cheaply manufactured, readily accessible, compact, durable, efficient and reliable in operation and always under perfect control.

The present invention provides means for obtaining variation in speed between a driving device and a driven device, which variation may range from rest or zero motion to full speed in either direction, and in addition thereto means are provided whereby there is automatically brought about a varying or changing of the ratio of speed and torque between the prime mover and the driven device, thus securing a proper proportion of available power at times when the resistance or load on the driven device is varied. In many power transmission means, of which that of a motor vehicle is a pertinent example, starting or even marked variations in load are liable to produce jars and shocks destructive to the vehicle machinery, or even parts of the vehicle itself, but in the present invention all such jars and shocks are eliminated and there is provided an elastic transmission whereby the vehicle may be started from rest so gradually that no shocks or jars are felt.

In motor vehicles particularly it is customary to provide manually operable means for controlling the operation of the mechanism and the present invention provides a very simple and yet effective interlocking mechanism for the usual brake and clutch operating pedals, which precludes the possibility of the accidental engagement of the power and the brake simultaneously, as well as preventing engagement of the reversing mechanism unintentionally. The invention in this respect includes means whereby the movement of the brake operating mechanism to the active position automatically disengages the clutch, and the arrangement is such that by partially actuating the brake pedal in the braking direction the locking mechanism may be utilized to relieve the operator of practically all the clutch spring pressure, especially when coasting.

The whole structure of the present invention so far as rotatable parts are concerned, is adapted to be wholly incased so that the running parts may be continually immersed in oil for thorough lubrication at all times, thus not only increasing the efficiency and durability of the inclosed parts, but protecting them against the effect of foreign substances, such as dust and dirt, and besides rendering the entire mechanism practically noiseless.

While the present invention is not of necessity confined to use on motor vehicles, it is particularly adapted to such use, wherefore in the following description it will be considered that the invention is applied to a motor vehicle, thus avoiding complexity of description, without, however, confining the use of the invention to the particular associations described.

The invention will be best understood from a consideration of the following detailed description, taken in connection with the accompanying drawings forming a part of this specification, with the understanding, however, that the embodiment illustrated, though practical, is by no means the only embodiment which the invention may assume, wherefore the invention is not confined to any strict conformity with the showing of the drawings, but may be changed and modified in various particulars, so long as such changes and modifications mark no material departure from the salient features of the invention.

In the drawings:—Figure 1 is a side elevation with parts broken away, showing an automobile or motor vehicle with the invention applied. Fig. 2 is a longitudinal diametric section, with some parts in elevation, of the transmission mechanism. Fig. 3 is a fragmentary section on the line 3—3 of Fig. 2. Fig. 4 is a section on the line 4—4 of Fig. 2 with some parts shown in elevation and other parts broken away. Fig. 5 is a fragmentary section on the line 5—5 of Fig.

2 with some parts in elevation and some parts omitted. Fig. 6 is a section on the line 6—6 of Fig. 2. Fig. 7 is an elevation of one of the clutch plates. Fig. 8 is a similar view of a companion clutch plate. Fig. 9 is a diagram of a charging outfit for the electromagnetic variable speed mechanism used in connection with the present invention. Figs. 10 to 13 are views of the pedal mechanism in different phases of operation. Figs. 14 to 17 are fragmentary sectional views of a lock for the pedals also showing different phases of operation.

Referring to the drawings, there is shown a motor vehicle 1 which may be taken as typical of any suitable driven device and therefore not necessarily limiting the use of the invention to motor vehicles, although the invention is particularly adapted to meet the conditions to be found in the running of motor vehicles. Because of this great adaptability of the invention the following description will for convenience be limited to the application of the invention to a motor vehicle.

For the purpose of propelling the motor vehicle the latter is provided with an engine 2 of any suitable type and power, and it may be considered that this engine is a multi-cylinder explosion engine using gasolene or some other hydrocarbon fluid as a fuel after the very prevalent practice of motor vehicle makers and users. The engine 2 is provided with a power shaft 3, one end of which is indicated in Fig. 2. This end of the power shaft is mounted in bearings 4 carried by an inclosing casing 5 which may form part of or be attached to the crank casing of the engine. It is customary to mount the power engine of the automobile at the front end of the vehicle, and by suitable transmission gearing to deliver power from the engine to the rear wheels of the vehicle indicated at 6 in Fig. 1, this power being transmitted through the rear axle. What may be termed the rear end of the power shaft 3 is formed with a radially disposed flange 7 at a short distance from the extreme rear end of the power shaft, thereby leaving a circumferential ledge 8 to the rear of the flange 7. Moreover, the rear end of the shaft 3 is axially counterbored, as indicated at 9, to an appropriate depth for a purpose which will presently appear.

Secured to the flange 7 by bolts 10, or in any other appropriate manner, is a web or disk 11 with a passage through the center of a size to cause the central portion of the web to snugly fit the ledge 8. The web is of appropriate radial extent and terminates in a rim 12 concentric with the longitudinal axis of the shaft 3 and extending from that face of the web 11 remote from the main portion of the shaft 3. The inner face of the rim 12 has formed on it, or may have secured to it, a suitable number of inwardly directed radial pole pieces 13 each carrying a coil 14 formed of insulated wire of appropriate gage and conductivity in accordance with the current to be used, the purpose of the coils 14 being to render the pole pieces 13 magnetic, and the windings are so arranged that when the coils 14 are energized by a suitable direct current the pole pieces 13 are made of alternately north and south polarity throughout the series. In Fig. 4 six pole pieces are indicated, but the number may be greater or smaller in accordance with circumstances. The particular construction of the pole pieces and coils need not be entered into, since these are mere matters of design which may be left to the constructing engineer.

Journaled in the counterbore 9 is one end of a short shaft 15 upon an intermediate portion of which there is mounted a hub 16 having a central radial web 17 with an axially expanded peripheral portion 18 having cheek plates 19 at the sides and holding between them an armature made up of ring laminæ 20, so that the armature is a laminated annular structure. To assemble the parts the armature spider made up of the hub 16, web 17 and peripheral portion 18 is made of two parts readily separable for the introduction of the ring-shaped lamina 20, and these latter, as is customary, are made of a suitable type of sheet iron punchings, insulated one from the other by sheets of paper or other fibrous material, or by an appropriate paint or varnish, or simply by the natural oxid, these all being common expedients in electrical structures.

The air gap between the armature and the polar extremities of the pole pieces 13 is made small, so that there may be little magnetic leakage. Applied to the shaft 15 at opposite ends of the hub 16 are lock collars 21 which may be in the form of nuts applied to suitably threaded portions of the shaft 15 and the hub 16 is fixedly secured to the shaft by a key or spline 22, thus not only providing for the proper centering of the armature, but constraining it to turn positively with the shaft 15, or the latter to turn with the armature, as the case may be.

The supporting ring 12 with the pole pieces 13 and the coils 14 may, for convenience of description, be termed the field, and the laminæ 20 with the parts supporting them may be termed the armature, but these are terms of convenience only and do not mean that one element shall stand still or be held from rotation and the other element shall rotate, for, as will hereinafter appear, both elements rotate with equal speed under some circumstances and sometimes the field may rotate and the armature stand still or rotate slowly, and under some circumstances the armature may rotate at a greater speed than the field. With this understanding the outer member will hereinafter be termed the field and the inner member the armature.

Carried by the web 11 is a cylindrical shelf or support 23 carrying two spaced rings 24, 24, and to these rings may be connected conductors 25 coming from respective terminals of the coils 14. If each coil has its terminals connected to the respective rings 24, then the coils are wound accordingly both as to quantity and gage of wire. It is quite feasible to connect the coils up in series and simply carry the two ends of the series by appropriate conductors 25 to the two collecting rings 24. The cylindrical shelf 23 may be made of insulating material or the rings 24 may be separately insulated therefrom if the shelf be made of metal. Both of these arrangements are indifferently employed by electrical constructors.

The casing 5 does not terminate coincident with the end of the shaft 3, but there expands radially until of greater diameter than the rim 12, and is then continued in the direction of the length of the axis of the shaft 3 to form an inclosing member 26 for the field which may be considered as typified by the ring 12, but the axial extent of the casing member 26 is only sufficient to partially inclose the field for the member 26 is met by a matching member 27 and both of these members may have lugs 28 formed thereon whereby fastening bolts may be used to connect the two casing members 26 and 27 together. The casing 26 is of sufficient axial length to inclose the field and certain parts carried thereby, and is then contracted toward the axis of the shaft 3 if the latter be considered as prolonged, and then the casing is provided with an elongated axially extended portion 28' of a suitable length to inclose certain mechanisms to be described.

The several casings or parts of casings referred to are usually of cylindrical form in cross section, but these casings are customarily made in two longitudinal halves or parts with appropriate flanges at the meeting edges to admit of the securing of the two parts together by bolts or screws, and their ready separation for the assemblage of the inclosed parts or the cleansing of the interior of the casing or inspection or repairs as may be needed. Moreover, the casing 26 is provided with passages 29, 30 usually located on what constitutes the top of the casing when in use and these passages are normally closed by a cover plate 31. Of course, it will be understood that suitable provision is made for rendering all the joints sufficiently tight to resist leakage of lubricant, for after the parts are assembled the casing may be supplied with a sufficiently large amount of lubricant to in most part immerse the moving structures, thus maintaining them in a thoroughly lubricated condition and excluding all dust and dirt.

At that end of the rim 12 remote from the web 11 there is a plate 32 secured to the corresponding end of the rim by screws 33 or otherwise. The plate 32 is provided with a central opening through which the shaft 15 and other parts extend, and adjacent this opening the plate 32 has made fast thereto a sleeve 33' by means of screw studs 34, the sleeve 33' being provided at the end adjacent the plate 32 with an outwardly extended radial flange 35 into which the studs 34 are screwed. At the end of the sleeve 33' remote from the flange 35 is an outwardly extended radial web 36 terminating in a peripheral axially extended flange 37 having its outer surface close to the inner wall of the corresponding portion of the casing extension 28'. Meeting the free edge of the flange 37 is a similar flange 38 carried at the other end by a radial web 39 on one end of a sleeve 40 corresponding to the sleeve 33' and in turn at the end remote from the flange 39 provided with another radially extended web 41 having a peripheral axially expanded flange 42 directed away from the web 39.

The flange 35 and web 36 form between them about the sleeve 33' an annular groove or channel in which is seated an anti-friction bearing 43 of known type and hence needing no particular description, and this bearing is in turn carried by a web 44 formed on the inner wall of the casing extension 28' at an appropriate point. The webs 39 and 41 at opposite ends of the sleeve 40 form together with said sleeve a channel for an anti-friction bearing 45 similar to the bearing 43, and this bearing is also carried by a web 46 formed on the inner wall of the casing extension 28' at an appropriate point. The two flanges 37 and 38 are coupled together by bolts or other fastening devices 47 shown in Fig. 6, the flanges 37 and 38 having appropriate ears 48 for the passage of the bolts or screws 47. The two sleeves 33' and 40 are therefore connected together as though made in one piece, but they are divided for the purpose of permitting the assembling of parts interior to the webs and flanges carried by the sleeves.

Mounted interior to the sleeve 33' is another sleeve 49 and within the space defined between the webs 36 and 39 this sleeve has an axially extended web 50 which at appropriate points near its periphery is formed with axially projecting bosses 51 each carrying a stud pin 52 screwed into the boss and at the other end formed with a laterally expanded head 53. Each pin between the boss 51 and its head 53 has mounted thereon a pinion 54. Within the sleeve 40 there is another sleeve 55 having at the end interior to the chamber between the webs 36 and 39 and adjacent to the latter an axially extended web 56, which may be similar in all respects to the web 50 with its bosses 51 and the web 56 carries headed pins 57 interspersing with the pins 52.

The shaft 15 is continued through the sleeve 49 and enters the space defined between the webs 50 and 56 and terminates at a point somewhat short of the mid-point between these two webs, the shaft from the corresponding end of the sleeve 49 to the terminus of the shaft being squared as indicated at 58.

The sleeve 55 is elongated with reference to the length of the sleeve 49 and is traversed by a shaft 59 to which reference will hereinafter be made, this shaft extending beyond the web 56 toward the squared end of the shaft 15, and is also there squared as indicated at 60. Mounted on the squared end 58 of the shaft 15 is a gear wheel 61 and mounted on the squared end 60 of the shaft 59 is a gear wheel 62 similar to the gear wheel 61. The adjacent ends of the squared portions 58 and 60 of the shafts 15 and 59 are separated by a spacer 63 which may also enter between the gear wheels 61 and 62. These gear wheels are spaced apart at their toothed peripheries a sufficient distance to permit engagement of the pinions 54 with the gear wheel 62 but not with the gear wheel 61, while other pinions 64 engage the gear wheel 61. The pinions 54 and 64 are of such length that they overlap and where overlapping they are so related as to mesh, so that all the pinions 54 and 64 are in mesh one with the other, while only the pinions 54 mesh with the gear wheel 62 and the pinions 64 with the gear wheel 61, and these pinions and gear wheels constitute the only connection between the shaft 15 and the shaft 59.

The casing 28' is sufficiently elongated for the accommodation of other structures than those already described and adjacent the end remote from the gearing just described the casing is formed with an inwardly directed radial web 65 carrying an anti-friction bearing 66 like the bearings 43 and 45, and this bearing supports the corresponding end of the sleeve 55 which is sufficiently elongated to reach the bearing 66. The shaft 59 projects through that end of the sleeve 55 supported by the bearings 66 and is there connected to a knuckle or universal joint 67 which in turn is connected to a shaft 68 by which power is transmitted to the driving wheels 6 of the vehicle. The shaft 68 has a spherical support 69 surrounding the universal joint 67 and this spherical support 69 is in turn mounted in a spherical bearing 70 formed on and attached to the corresponding end of the casing 28', the bearing 70 having a removable portion 71 permitting the introduction of the support 69 in the spherical seat. This removable portion 71 has a central opening 72 of sufficient size to permit the required movements of the shaft 68 and its support 69 about the universal joint 67, and said removable portion 71 is held in place by screws 73, one end of each screw extending through the end of the casing 28' and through an appropriate portion of the member 71 and there receiving a nut 74, while the other end of the screw is threaded into a web or disk 75 held by the screw against the web 65 within the space between this web 65 and the web 46, these last named webs being separated sufficiently to accommodate certain devices to be described, including the web 41 and its axially extended peripheral flange 42, which latter extends from the web 41 toward the web 65 concentrically with the sleeve 55 and shaft 59. The web or disk 75 is provided with a peripheral axially extended flange 76 similar to the flange 42 and extending toward the latter, but spaced therefrom by an appropriate distance.

The sleeve 55 where surrounded by the peripheral flanges 42 and 76 is made polygonal, the particular polygon being eight sided, as indicated in Fig. 3. These polygonal portions of the shaft are designed to receive disks 77 one of which is shown separately in Fig. 8, and these disks are of a diameter to clear the inner wall of the respective flange 42 or 76. While the sleeve is described as polygonal at the particular points under consideration and particularly as octagonal, it may be of any other suitable shape or any other provision may be adopted, which will prevent rotation of the disks 77 upon the sleeve.

The flanges 42 and 76 are provided with a circular series of slots 78 extending from their outer edges toward the webs supporting the flanges, and these slots are designed to receive tongues 79 on other disks 80 each with a central opening 81 of a diameter to clear the polygonal portion of the sleeve, so that if otherwise unrestrained each disk 80 may rotate upon the sleeve where surrounding it. The disks 77 and 80 alternate and each flange 42 or 76 with its web 41 or 75, as the case may be, defines a chamber surrounding the sleeve 55 in which may be lodged an appropriate number of disks 77 and 80 in alternating relation. By this means each receptacle or housing for the disks confines a number of disks made fast to the sleeve 55 so far as rotative movement is concerned and free of direct connection with the respective flange 42 or 76, while the disks 80 are made fast to the said flanges so far as rotative movement therewith is concerned and are free of direct connection with the sleeve 55. The terminal disk of each group, this being a disk 77, may be thickened at the central portion, as indicated at 82.

be brought to bear upon the portion 82 of the outermost disk in a direction to urge it toward the closed end of the pocket housing the disks, then each disk 77 will be forced into contact with a disk 81 until the entire series are in contact, thus presenting a greatly extended frictional surface, and since one set of disks may be considered as in rotation the other set of disks will by frictional contact be caused to rotate and the part directly connected with the second set of disks will participate in such rotative movement. The arrangement provides greatly expanded frictional surfaces which even though covered with lubricant will engage with sufficient force to transmit more power than the prime mover is able to furnish, and this power may be applied gradually, but with certainty so that even with the exertion of a comparatively moderate force the friction surfaces may be made to grip or clutch to such an extent that when they are engaged to the full desired extent slipping is wholly obviated even under full load.

Mounted upon the sleeve 55 between the two groups of disks is another sleeve 83 of sufficient internal diameter to house a spring 84 between the sleeve 83 and the sleeve 55 and one end of the sleeve 83 is provided with an inturned flange 85 which may bear upon the exterior of the sleeve 55 and form an abutment for one end of the spring 84, while the other end of the spring abuts against a nut 86 in the form of an internally threaded ring entering the end of the sleeve 83 remote from the flange 85 and engaging appropriately placed screw threads on the sleeve 55. The nut 86 is adjacent that group of disks within the flange 76, which latter, because the web 75 carrying it is made permanently fast to the casing 28', may be called the fixed flange, while the other flange 42 may be termed a rotatable flange because it is carried by the web 41 in turn carried by the sleeve 40 which has the web 39 provided with the flange 38 made fast to the flange 37, and this latter by the web 36 and sleeve 33 is made fast to the disk 32 which in turn is fast to the field rim 12 secured to the main drive shaft 3.

The sleeve 83 is externally screw threaded for a distance from the end provided with the flange 85, while the remainder of the sleeve is smooth and the end remote from the flange 85 is provided with an outturned radial flange 87. Mounted on the threaded part of the sleeve 83 is an internally threaded ring 88 having one end thickened to form a shoulder 89, and between this shoulder and the flange 87 the smooth part of the sleeve 83 carries a collar 90 of less width than the distance between the shoulder 88 and flange 87 to accommodate balls 91 to form a thrust bearing, while the edges of the collar are extended into overlapping relation to the shoulder 88 and flange 87, as indicated at 92 and 93, respectively, the extension 93 serving as a retainer for the balls 91.

By reference to Fig. 5 it will be seen that the collar 90 has trunnions 94 on diametrically opposite sides entering ears 95 at the ends of a yoke 96 connecting the ears in overriding relation to the collar, and this yoke is also provided with trunnions 97, 98, respectively, extending through bearing sleeves 99 carried by the appropriate part of the casing 28', these sleeves 99 being of sufficient length to engage inner shoulders 100 at those ends of the trunnions 97 and 98 where joining the yoke 96. The trunnion 97 simply serves as a supporting member while the trunnion 98 is of sufficient length to extend for an appropriate distance beyond the corresponding side of the casing 28' and constitutes an actuating member for the yoke, as will hereinafter appear. The sleeves 99 not only serve as elongated bearings for the trunnions but avoid leakage of lubricant which is liberally supplied to the casing to practically immerse the moving parts within the casing.

The normal tendency of the spring 84 is to force the flange 85 into engagement with the outermost disk 77 of the group carried by the rotatable flange 42 and all thrust of the spring through the sleeve 83 upon the collar 90 is transmitted through the ball bearings 91. When, however, it is desired to utilize the clutch carried by the fixed flange 76 it is necessary to compress the spring 84 against its normal tendency and the force necessary to bring this about is exerted through the ball bearings 91. In either case, therefore, the thrust of the spring is so far as the collar 90 is concerned, exerted through the ball bearings 91. While the bearings 91 are referred to as ball bearings and other anti-friction bearings through the structure are indicated as ball bearings, it will be understood that any appropriate form of anti-friction bearings may be employed where it is desirable to use anti-friction bearings.

The shaft 59 is supported within the sleeve 55 at appropriate points, preferably near the ends, by sleeves 100' of appropriate material designed to reduce friction and at the same time resist the wear. The shaft 15 within the sleeve 49 and within the counterbore 9 has similar bearing sleeves 101.

It is designed that the coils 14 receive current unidirectionally, wherefore guides 102 are formed in the casing 5 to receive brushes 103 in position to bear upon the collecting rings 24, these brushes being urged into contact with the rings by suitable springs 104 and also being provided with binding nuts 105 or other suitable connectors; whereby feeding conductors may be coupled to the brushes.

In order to supply the energizing current for the coils 14 and for other purposes, there is provided a motor generator 106 which may receive power from the prime mover 2 and may be either directly connected to the shaft 3 or through the intermediary of belting or gearing, as is customary. This motor generator is preferably of the direct current series type, for when operating as a motor it is advantageous over a shunt wound motor for the purposes of the present invention. The output of the motor generator when operating as a generator may be varied by varying the speed of the prime motor within its limited range of variation, and as the magnetizing force of the electromagnet composed of the coils 14 will be directly proportionate to the output of the generator, the speed of the vehicle may be varied at will, the automatic variation hereinafter referred to acting in conjunction with the variation in output to the generator. Ordinarily the variation in speed of the vehicle depends upon the variation in speed of the prime motor, but with the present invention this variation in speed of the prime motor causes a more pronounced variation in the speed of the vehicle than heretofore, so that with such limited range of speed variation of the prime motor the speed of the vehicle may be varied from absolute rest to maximum, or the reverse.

In conjunction with the motor generator 106 there is provided a double throw switch 107 arranged to couple up the motor generator as a generator to a storage battery 108 or to mains 109, 110 coupled to the brushes 103. When the switch 107 is in one operative position the motor generator is coupled up to the storage battery 108 in a manner to charge it and at the same time furnish current to the coils 14 through the conductors 109 and 110 and in one of these last named conductors, say the conductor 109, there is included a switch 111 movable into contact with either of two terminals 112, so that the switch 111 may have a neutral position between the terminals where the circuit is broken and if moved in either direction from the neutral position will engage a terminal 112 to complete the circuit. The purpose of this arrangement will appear hereinafter. In order to prevent overcharging of the storage battery a device 113 is provided which will cut out the battery when it has been fully charged. This device is not illustrated in detail since numerous devices for such purpose have been proposed and the construction of the device forms no part of the present invention. In another position of the switch the storage battery 108 is coupled up to the motor generator in a manner to cause the motor generator to run as a motor to thereby start the engine and run it until the proper cycle of operations under the explosive charges is established. By then throwing the switch 107 the windings of the motor generator are coupled up in a manner to cause the generator to deliver current without changing its direction of rotation and recharge the storage battery to its capacity and at the same time charge the conductors 109 and 110 provided the switch 111 be in the closed position, so that under these circumstances the coils 14 are energized to an extent depending upon the speed of rotation of the armature of the motor generator 106.

If it be assumed that the prime motor 2 is running, then, of course, the shaft 3 is being rotated and traveling with it is the field ring 12, cores 13 and coils 14. If it be further assumed that the switch 111 is in the closed position, then the coils 14 are energized and the cores 13 are magnetized, whereupon the armature represented by the annuli 20 participates in such rotative movement in synchronism therewith as soon as the armature has time to come up to speed after the closing of the switch 111. As soon as the power shaft 3 has reached normal speed the motor generator 106 is delivering full current for such speed and the armature is being rotated by the rotative movement of the field with a force commensurate with the charging current, so that in the properly designed structure the armature will deliver sufficient power to drive the vehicle at a certain predetermined speed or under certain predetermined conditions of load. Under the conditions assumed those parts connected to the rotating field structure, namely, the sleeve 33, web 36, flanges 37 and 38, web 39, sleeve 40, web 41, flange 78 and disks 80 positively connected to said flange, participate in such rotative movement. If now the clutch 83 be allowed to move under the action of the spring 84 until it bears against the outermost disk 77 of the group of clutch disks confined within the flange or housing 42, the disks 77 and 80 are brought into frictional engagement as to cause a clutching of the sleeve 55 to the shaft 3 through the intermediate devices already mentioned. The armature 20 now rotating in synchronism with the field 12, the latter being charged, the differential gear represented by the gear wheels 61 and 62 and the pinions 54 and 64 rotates bodily, so that the whole structure operates the same as though there were a simple clutch interposed between the power shaft 3 and the shaft 59, the latter being driven from the sleeve 55 through the intermediary of the differential gearing. The rotative movement of the shaft 59 is imparted by the universal joint 67 through the shaft 68 and from the latter to the drive wheels of the vehicle. The universal joint 67 is made with broad faces so that the parts are in contact, thus relieving the pivot pins or bolts from strain. The running gear of the vehicle is quite flexible as is customary, and this flexibility is permitted with respect to the driving gear by the universal joint 67 and the spherical support 69 in the spherical holding means 70 and 71.

The driving movement thus described relates to the forward drive of the vehicle. Suppose, now, it be desirable to back the vehicle, then the clutch sleeve 83 is moved in a direction to further compress the spring 84 and bring the flange 87 into engagement with the outermost one of the disks 77 in the fixed flange or housing 76. Those disks 80 directly connected with the flange or housing 76 being held against rotation, the disks 77 when brought into frictional engagement therewith will also be held against rotation, and this will hold the sleeve 55 against rotation, the web 53 and pinions 64 carried thereby being also held against rotation about the axis of the shaft 59, but the rotative movement of the shaft 15 is imparted to the gear wheel 61, which in turn causes a rotative movement of the pinions 64, and these in turn impart rotative movement to the pinions 54, although these pinions, as well as the pinions 64, are held against orbital movement. The rotative movement of the interconnected pinions and the gear wheel 61 imparts rotative movement to the gear wheel 62, and this in turn imparts rotative movement to the shaft 59, but in a direction the opposite to that first described, so that the direction of movement of the vehicle is reversed. When the clutch sleeve 83 is in the intermediate position between the two series of clutch disks, then the shaft 59 is not coupled to the prime mover at all and the vehicle will either be at rest or may travel independently. In a motor vehicle it is necessary that these different adjustments be brought about by means accessible to the operator when seated in the vehicle, so that following the ordinary practice, a pedal arrangement is provided, but in order to accommodate such pedal control to features of the present invention, it becomes necessary to arrange the pedal control in a different manner than heretofore. The arrangement of pedals is illustrated in Fig. 5 and in Figs. 10 to 18. Two angle pedals 114, 115 are mounted upon that portion of the trunnion or shaft 98 outside the casing 28', each pedal being provided with an appropriate foot piece 116 for the application of the foot of the user. The pedal 114 is provided with a hub 117 at the end remote from the foot plate 116 and formed on this hub is a segmental extension or plate 118 extending therefrom at an angle to the length of the main portion of the pedal 114, which latter is made fast to the shaft extension 98 to cause actuation of the latter by the proper operation of the pedal 114. The other pedal 115 is provided with an elongated hub 119 and also with a segmental plate 120 extending from the hub at an angle to the main portion of the pedal 115. The hub 119 is free to move on the shaft or trunnion 98 and both of the hubs may be held to the shaft 98 by a nut 121 applied to a reduced threaded extension of the shaft.

One corner of the plate 120 is pivotally connected to one end of a link 122 and the other end of this link is pivoted to one end of another link 123, the farther end of which last named link is pivoted to a stud 124 carried by a suitable projection from the casing 28'. At the junction point 125 of the two links 122 and 123 there is pivoted one end of another link 126 terminating at the farther end in an elongated eye 127 provided with an elongated slot 128 in which engages a pin 129 on the lever 114.

The two segmental plates 118 and 120 have one edge lodged in appropriate grooves in a guide member 130 carried by the casing 28', and this guide member may be made up of an appropriate number of plates held to the guide member by bolts or other fastening devices 131. The guide member 130 has an intermediate portion 132 spacing the segmental plates 118 and 120, and through this intermediate portion is a passage 133 in which is lodged a ball 134. This ball is designed to operate as a floating stop member and may therefore be either in the form of a ball or sphere or in the form of a pin or cylinder, or be of any suitable shape for the purpose. That face of the plate 118 adjacent to the intermediate portion 132 of the guide member 130 is provided with an elongated recess 135 and the plate 120 on that face toward the intermediate member 132 is provided with a recess 136 agreeable to the size of the ball or stop member 134. The thickness of the intermediate portion 132 and the thickness of the stop member 134 are so related that the stop member will project into one or the other of the recesses 135 or 136, the thickness of the stop member 134 being greater than that of the intermediate member 132 by the depth of the recess 135 or 136, each recess being of the same depth. If the plates 118 and 120 be so positioned that the recesses are opposite the stop member 134, then one or the other of the plates may be moved to carry its recess out of coincidence with the stop member 134, but the other plate will remain in a locked position by said stop member, except that the plate 118 has an extent of movement independent of the stop member agreeable to the length of the recess 135. By this arrangement certain movements are permitted for each pedal and during certain positions of each pedal the other pedal is locked against a movement sufficient to permit the actuation of certain of the devices controlled by the pedal.

The pedal lever 114 is designed to operate the clutch and is therefore made fast to the trunnion or shaft 98, so that the yoke 96 will participate in movements of the clutch pedal and when these movements in one direction or the other are sufficient, then the clutch is actuated to active position for forward or reverse movement of the vehicle. The other pedal lever 115 is designed to operate the brakes of the vehicle, and as these brakes may be of the customary construction, it is deemed unnecessary to illustrate them, but since the brake pedal has to do with certain actions of the clutch pedal the two coöperate to a certain extent. Furthermore, the clutch pedal has a connection 137 (see Fig. 9) with the switch 111, so that when the clutch is in the intermediate or neutral position the switch 111 is open, but when the clutch pedal is actuated to cause the clutch to engage in either the forward or reverse positions, then the switch 111 causes a closure of the circuit through the conductors 109 and 110.

If the vehicle be traveling forward with the clutch in the forward engagement and the brakes off, then the clutch and brake pedals assume a position like that shown in Fig. 11 and the interlocking member 134 is out of engagement with the recess 136, while in engagement with the recess 135, but the latter is long enough to permit a movement of the clutch pedal sufficient to allow the clutch spring 84 to expand and force the clutch sleeve 82 into engagement with the clutch disks in the housing 42, thus relieving the foot of the operator from all exertion. The positions of the plates 118 and 120 with respect to the interlocking member 134 under the circumstances assumed is indicated in Fig. 15. Suppose, now, that it is desirable to coast or to allow the vehicle to travel independently of the prime-motor, the clutch pedal 114 is depressed to its neutral position shown in Fig. 12, which movement is limited by the interlocking member 134, thereby preventing unintentional engagement of the reverse. When so desired the vehicle may be allowed to coast by partially depressing the brake pedal 115, say, to about the position of the pedal 114 shown in Fig. 12. This partial depression of the brake pedal 115 is insufficient to apply the brake, but sufficient to move the clutch pedal 114 from the "on" position to an intermediate or neutral position. Assuming the brake pedal 115 to be in said position, the foot of the operator is relieved of practically all the clutch spring pressure.

Suppose the clutch pedal 114 is in the position where the clutch is operative for driving the vehicle forward and that it be desirable to apply the brake, and further let it be assumed that this position of the parts is somewhat similar to that illustrated in Figs. 11 and 15. The brake pedal is pressed to move it toward the left, as shown in Fig. 11, and this will cause a movement of the links 122 and 123 about the pivot 124 to propel the pivot connection 125 away from the shaft 119 and the link 126 will participate in such movement until the end wall of the slot 128 remote from the pivot 125 engages the pin 129 and the clutch lever is thereby moved by the pressure of the foot of the operator upon the brake lever. The first part of this movement of the clutch lever is quite rapid, and then rapidly diminishes, so that the further movement of the brake lever to the position where the brakes are "on" maintains the clutch lever in the neutral position, the length of the recess 135 admitting of this movement and preventing the ball 134 from interfering with the proper movement of the brake pedal. The elongated slot 128 and the elongated recess 135 permit a certain angular movement of either of the pedals independently of the other. For instance, the clutch pedal may be held in the neutral position while the brake pedal is allowed to move to release position and with the brake pedal in this position the clutch pedal may be moved to its forward clutch engaging position and again back to the neutral position independently of the brake pedal. Suppose that the machine is standing still with the brake "on", a slight depression of the clutch pedal 114 is required to unlock and allow the brake pedal to return to released position and the clutch pedal is then allowed to move to its clutch engaging position, whereby the prime mover is clutched to the driving wheels for forward movement under the expansive action of the spring 84. This operation causes the energization of the coils 14, and as the magnets made up of the cores 13 and coils 14 are rotating with the engine, the magnetic flux tends to drag the armature around, and, therefore, sets the armature and parts controlled thereby in motion, the speed quickly building up to synchronism, but still slowly enough to prevent any shocks or jars, so that the vehicle will gradually accelerate without jerks and also without wear on the clutch plates or disks, which latter because of the character of the work demanded may be made of different materials. For instance, the disks 77 may be made of steel and the disks 80 of bronze. The magnetic field structure tends to hold the speed of the armature to that of said field structure and the current generated by the motor generator when the prime mover is operating at full speed is such that the armature will be caused to rotate with the field structure at substantially the same rate provided the vehicle is subject to normal load and road conditions, the differential gearing in such case simply revolving bodily with the prime mover at the same speed. Suppose however, that for some reason the resistance or load on the shaft 59 increases, then the gear 62 fast to this shaft will slow up, since the over load tends to slow up the shaft. The pinions of the differential gear will thereupon begin to rotate on their own axes in a direction to accelerate the speed of the shaft 15 through the gear 61, thus urging the armature 20 to turn faster than the field structure, thereby distorting the magnetic lines of force to a degree corresponding to the increased load conditions. This distortion of the magnetic lines of force causes an increase in the magnetic drag or pull exerted upon the field structure, thus aiding the prime motor in giving the increased torque required. Any decrease in the speed of the shaft 59 due to increased load or drag will therefore, produce a corresponding increase in torque and the reverse is also true, so that the ratio of speed and torque variation are attained automatically and gradually to thereby secure a proper proportioning of available power at such times when the resistance or load on the driven device is varied. The same condition prevails in starting the vehicle from a state of rest, or at any time when the power is applied and the rate of speed of the driven shaft is out of correspondence with the rate of speed of the prime mover, thus effecting a smooth and gradual application of the power and eliminating all shock or undue strain of parts such as is destructive and objectionable.

To vary the speed of the vehicle at will advantage is taken of the inherent capability of the prime mover for limiting variation of speed, and such variation of speed common to explosion engines causes a variation in the output of the motor generator, and consequently of the magnetizing force of the field structure or electromagnet. This permits the armature to operate at different speeds depending upon the degree of magnetization of the field structure or electromagnet, and the armature controlling the action of the differential gearing thereby causes the desired change in the speed of the vehicle.

When it is desirable to reverse the direction of travel of the vehicle, the brake pedal 115 is moved until the recess 136 is coincident with the ball 134, and then the clutch pedal may be depressed to a greater extent than would be allowed by the length of the recess 134, the pin 129 not interfering because of the length of the slot 128, and pressure upon the clutch pedal causes a compression of the spring 84 to an extent permitting the clutch sleeve 83 to engage the set of disks within the housing 76, whereby the sleeve 55 is held against rotation and the shaft 59 is reversely rotated through the differential gearing in a manner already described. The position of the pedal structure for bringing about the reverse is indicated in Figs. 13 and 17.

Figs. 11 and 15 show a position of the pedals where the clutch is engaged for forward drive, Figs. 12 and 16 show a position of the pedals where the clutch is in the neutral position and the brake in the full released position, and Figs. 13 and 17 show the positions assumed by the pedals for reversing the direction of movement of the vehicle. Figs. 10 and 14 show the braking position.

The brake can only be applied after the clutch pedal has been moved to its neutral position from the position whereby the vehicle is moved in the reversed direction. In the forward motion of the vehicle the clutch is always disengaged prior to the application of the brake by direct pressure upon the brake pedal and when the brake is applied the clutch pedal is held in the neutral position. From this it will be seen that the structure provides a very simple and yet effective interlocking mechanism for the pedals precluding the possibility under any circumstances of accidentally engaging the power and the brake simultaneously.

Should a condition arise where the brake becomes inoperative or where an emergency stop is imperative, the reverse motion clutch position may be established, thus providing a very powerful brake which, however, should not be resorted to except in emergency conditions, and after use in this manner the clutch pedal should be placed in the neutral position as soon as the vehicle comes to rest to avoid the vehicle moving in the opposite direction. The rim 12 with the cores 13 and coils 14 all fast to the engine shaft, constitute an efficient fly-wheel for the engine.

From the foregoing it is believed that the advantages of the invention in practical use will be appreciated, and they need not therefore be referred to in detail.

A mechanism for motor-vehicles constructed in accordance with the invention can not only be built cheaply and operated economically, but requires very little attention on the part of the operator. At the same time for reasons which have been explained in full, the speed of the vehicle is capable of being varied from absolute rest to maximum, or vice versa, and in either direction, with a limited range of speed variation of the prime-motor. And further, variations in speed and torque, due to grade or load are accomplished automatically, and gradually.

What is claimed is:—

1. The combination of a drive member, a driven member, differential gearing between the drive and driven members, and a two part electromagnetic coupling between the differential gearing and the drive member, with each part of the coupling arranged for connection with a respective part of the differential gearing.

2. The combination of a drive member, a driven member, differential gearing between the drive and driven members, and an electromagnetic coupling between the differential gearing and the drive member, said electromagnetic coupling comprising two members in inductive relation and at all times out of mechanical contact, and each part of the electromagnetic coupling being arranged for connection to a respective part of the differential gearing.

3. The combination of a drive shaft, a driven shaft, differential gearing connected to the driven shaft, an electromagnetic structure fast to the drive shaft for rotation thereby, and also provided with means for coupling it to one side of the differential gearing and a rotatable member fast to the other side of the differential gearing and in inductive relation to and at all times out of mechanical contact with the electromagnetic structure.

4. The combination of a drive shaft, a driven shaft, differential gearing between the shafts, an electromagnetic structure fast to the drive shaft for rotation thereby, and also provided with means for coupling it to one side of the differential gearing, and a member of magnetic material fast to the other side of the differential gearing and in inductive relation to and at all times out of mechanical contact with the electromagnetic structure.

5. The combination of a drive shaft, an electromagnetic structure fast thereto, a clutch member fast to the electromagnetic structure, a driven shaft, differential gearing connected to the driven shaft, a clutch member for coupling one side of the differential gearing to the other clutch member, and a rotatable member of magnetic material in inductive relation to the electromagnetic structure and connected to the other side of the differential gearing.

6. The combination of a drive shaft, a driven shaft, an electromagnetic structure connected to the drive shaft, a clutch member connected to the drive shaft, differential gearing connected to the driven shaft, a clutch member connected to the differential gearing in operative relation to the clutch member connected to the drive shaft, a rotatable member in inductive relation to the electromagnetic structure, and connections between said rotatable member and the differential gearing.

7. The combination of a drive shaft, an electromagnetic structure fast thereto, a clutch member also fast to the drive shaft, another clutch member provided with means for holding it against rotation, a rotatable member in inductive relation to the electromagnetic structure, differential gearing interposed between the said rotatable member and the driven shaft and connected to both, clutch members in controlling relation to the differential gearing and in operative relation to the first named clutch members, and means for actuating the last named clutch members into active relation to either of the first-named clutch members at will.

8. The combination of a drive member, a driven member, an electromagnetic coupling between the drive and driven members, and means between one member of the coupling and the driven member for accelerating or retarding said coupling member with respect to the other coupling member in reverse relation to the speed of the driven member.

9. The combination of a drive member, a driven member, an electromagnetic coupling between the drive and driven members, means between one member of the coupling and the driven member for accelerating or retarding said coupling member with respect to the other coupling member in inverse relation to the speed of the driven member, and a clutch between the drive member and said accelerating or retarding means.

10. The combination of a prime mover, a driven member, an electromagnetic coupling between the prime mover and the driven member, means driven by the prime mover and responsive to changes of the speed thereof for varying the energization of the electromagnetic coupling, and means between the coupling and the driven member for accelerating or retarding the corresponding member of the coupling inversely to the speed of the driven member.

11. The combination of a prime mover, a driven member, an electromagnetic coupling between the prime mover and driven member, means responsive to variations in speed of the prime mover for energizing the electromagnetic coupling and causing variations in the energization of the electromagnetic coupling due to variations in speed of the prime mover, and a differential gearing between the coupling and the driven member for accelerating or retarding the corresponding member of the coupling inversely to the speed of the driven member.

12. The combination of a prime mover and a driven member, an electromagnetic coupling between the prime mover and driven member and comprising two rotatable members in inductive relation, one of said two members being fast to the prime mover, a differential gearing, a clutch for connecting that coupling member fast to the prime mover to one side of the gearing, and a connection between the other side of the gearing and the other rotatable member of the coupling.

13. The combination of a prime mover, a driven member, differential gearing, means for clutching the differential gearing to the prime mover, and electromagnetic means for connecting the differential gearing to the driven member.

14. The combination of a prime mover, a driven member, differential gearing, means for clutching the differential gearing to the prime mover, and electromagnetic means for connecting the differential gearing to the driven member, said electromagnetic means having two members one of which is fast to the prime mover and the other of which is fast to the differential gearing, and said members being in inductive relation.

15. The combination of a drive shaft, a circular series of electromagnets fast thereto, a rotatable member of magnetic material surrounded by and in inductive relation to the electromagnets, a shaft carrying the rotatable member, differential gearing to one side of which the last-named shaft is connected, a driven shaft connected to the other side of the differential gearing, and means for connecting the drive shaft to and disconnecting it from the differential gearing at will.

16. The combination of a drive shaft, a driven shaft and an intermediate shaft all in alinement, a circular series of magnets carried by and fast to the drive shaft, a rotatable member on the intermediate shaft in inductive relation to the magnets, differential gearing between the driven and intermediate shaft and connected to both, a sleeve on the driven shaft connected to the differential gearing, clutch members on the sleeve, other clutch members in operative relation to the first named clutch members and fast to the drive shaft, and means for moving the clutch members into and out of clutching position.

17. The combination of a drive shaft, a driven shaft and an intermediate shaft all in alinement, a circular series of magnets fast on the drive shaft, a rotatable member on the intermediate shaft in inductive relation to the magnets, differential gearing between the driven and intermediate shafts and connected to both, a sleeve on the driven shaft connected to the differential gearing, two sets of clutch members on the sleeve, other sets of clutch members in operative relation to the first named clutch members, one set being fast to the drive shaft and the other set fixed against rotation, and means for operating either of the related sets of clutch members into and out of engaged position.

18. The combination of a drive shaft, a driven shaft and an intermediate shaft all in alinement, a circular series of magnets fast on the drive shaft, a rotatable member on the intermediate shaft in inductive relation to the magnets, differential gearing between the driven and intermediate shafts and connected to both, a sleeve on the driven shaft connected to the differential gearing, two sets of clutch members on the sleeve, other sets of clutch members in operative relation to the first named clutch members, one set being fast to the drive shaft and the other set fixed against rotation, and means for operating either of the related sets of clutch members into and out of engaged position, the electromagnets, the differential gearing and the clutches being provided with an inclosing casing.

19. The combination of a drive shaft having a flange at one end, a web fast to said flange and outstanding radially from the shaft, said web carrying at its outer edge a circular rim in concentric relation to the axis of the shaft and provided with instanding radially disposed pole pieces, magnetizing coils on the pole pieces, another shaft in alinement with the first shaft, a rotatable member of magnetic material carried by the second shaft, and means for connecting the rotatable series of magnets mechanically to the second named shaft, said means being constructed to permit rotative movements of the second named shaft independently of the rotative movement of the first named shaft.

20. The combination with a power shaft, of a circular series of electromagnets fast thereto, another shaft in alinement with the first named shaft, a rotatable member of magnetic material mounted on the second shaft and constrained to move with the electromagnets by the magnetic pull exerted thereby, and mechanical means connecting the two shafts, said mechanical means being constructed to permit movements of the second shaft independently of the first named shaft.

21. The combination of a drive shaft, a rotatable series of electromagnets fast thereto and participating in the rotation of the drive shaft, another shaft axial to the drive shaft, a rotatable member in inductive relation to the electromagnets and carried by the second shaft, a gear wheel fast to the second shaft, a driven shaft provided with a gear wheel adjacent the first named gear wheel, a rotatable series of intermeshing pinions with the alternate pinions meshing with the respective gear wheels, and means for coupling the drive shaft to the series of pinions or uncoupling it therefrom at will.

22. The combination of a drive member, a driven member, an electromagnetic coupling between the drive and driven members, means between one member of the coupling and the driven member for accelerating or retarding said coupling member with respect to the other coupling member in inverse relation to the speed of the driven member, and a clutch structure for coupling the drive member and the accelerating or retarding means comprising two spaced members one of which is held against rotation and the other of which is free to rotate, and a clutching member intermediate of the two clutch members and having a normal tendency to engage one of the clutch members to cause the active operation of the clutch structure for rotation in one direction and movable against its normal tendency to cause the operation of the clutch structure for rotation in the opposite direction.

23. The combination of a drive member, a driven member, an electromagnetic coupling between the drive and driven members, means between one member of the coupling and the driven member for accelerating or retarding said coupling member with respect to the other coupling member in inverse relation to the speed of the driven member, and a clutch structure between the drive member and said accelerating or retarding means and having a normal tendency to cause engagement of the drive member with the accelerating or retarding means for movement in one direction, and a pedal for operating the clutch structure and having means for locking it in a neutral position.

24. The combination of a drive member, a driven member, an electromagnetic coupling between the drive and driven members, means between one member of the coupling and the driven member for accelerating or retarding said coupling member with respect to the other coupling member in inverse relation to the speed of the driven member, a clutch structure between the drive member and said accelerating or retarding means and having a normal tendency toward the clutching position to cause rotation of the driven member in one direction, and a pair of manually operable members, one of which is connected to the clutch structure for actuating it to the neutral or reverse position, the manually operable members having interlocking devices for holding them against simultaneous active movement.

25. The combination of a drive member, a driven member, an electromagnetic coupling between the drive and driven members, means between one member of the coupling and the driven member for accelerating or retarding said coupling member with respect to the other coupling member in inverse relation to the speed of the driven member, a clutch structure between the drive member and the accelerating or retarding means and having a normal tendency to the clutched position for forward drive, a clutch pedal connected to the clutch structure, a brake pedal, and interlocking means between the pedals for preventing active movement of either pedal during the active movement of the other.

26. The combination of a drive member, a driven member, an electromagnetic coupling between the drive and driven members, means between one member of the coupling and the driven member for accelerating or retarding said coupling member with respect to the other coupling member in inverse relation to the speed of the driven member, a clutch structure between the drive member and said accelerating or retarding means and having a normal tendency toward the forward drive position, a clutch operating pedal, a brake operating pedal, a link connection between the two pedals for causing the operation of one pedal by the other, and interlocking means between the two pedals for preventing active movement of one pedal during the active movement of the other.

27. The combination of a drive member, a driven member, an electromagnetic coupling between the drive and driven members, means between one member of the coupling and the driven member for accelerating or retarding said coupling member with respect to the other coupling member in inverse relation to the speed of the driven member, a clutch structure between the drive member and said accelerating or retarding means, and having a normal tendency toward the forward drive position, a clutch pedal, a brake pedal, a toggle link and lost motion link connection between the two pedals, and an interlocking means between the pedals for preventing the active movement of one pedal during the active movement of the other, the lost motion connection and the interlocking means being constructed to permit a limited movement of the clutch pedal independently of the brake pedal.

28. The combination of a prime mover, an electric generator connected to the prime mover for actuation thereby, a driven member, an electromagnetic coupling between the prime mover and driven member, means for connecting the generator with the electromagnetic coupling, and means for causing an acceleration or retardation of one member of the coupling in accordance with load conditions on the driven member.

29. The combination of a prime mover of the explosion type, a motor generator connected therewith, an electric accumulator, controllable connections between the motor generator and the accumulator, a driven member, an electromagnetic coupling between the prime mover and the driven member, controllable connections between the motor generator and the electromagnetic coupling, and means for connecting the motor generator to the accumulator for starting the prime mover or for charging the accumulator and energizing the electromagnetic coupling at will.

30. In an automobile, a prime mover, a source of electric current a driven member, an electromagnetic coupling between the prime mover and driven member, a clutch for connecting the prime mover to the driven member, manually operable means for operating the clutch, circuit connections between the source of current and the electromagnetic device, and circuit controlling means in said electric connections in turn connected to the manually operable means for the clutch to break the circuit connections when the clutch is in the disengaged position.

In testimony that I claim the foregoing as my own, I have hereto affixed my signature in the presence of two witnesses.

JOHN CLINTON RIEGEL.

Witnesses:
A. D. KNITTLE,
JOHN ROBERT JONES.